April 29, 1941.  W. C. WAGNER  2,240,357

FLUID METER

Filed Dec. 13, 1937

WITNESS:

INVENTOR
Walter C. Wagner
B
Augustus B. Stoughton
ATTORNEY.

Patented Apr. 29, 1941

2,240,357

UNITED STATES PATENT OFFICE 2,240,357

FLUID METER

Walter C. Wagner, Ardmore, Pa.

Application December 13, 1937, Serial No. 179,402

6 Claims. (Cl. 73—233)

This invention relates to metering of flow of gases and vapors, and, in particular, relates to a pressure compensator.

Heretofore, pressure compensators to be used in conjunction with gaseous or vapor flow meters, to permit direct registration in units of weight or in units of volume at a standard pressure, required highly complicated mechanisms comprising delicate parts which easily lost their adjustment, and had intermittently meshing gear trains which did not always function properly, or caused errors.

The primary object of my invention is to provide a device in which these defects are overcome.

Another object of my invention is to provide a pressure compensator which can be readily and simply adjusted under operating conditions.

Still a further object of my invention is to provide a device which will automatically compensate for pressure, readings of a gas or vapor flow meter operated under conditions of variable pressure, and will register the flow directly in units of weight or volume at a standard pressure.

Another object of my invention is to produce a pressure compensator for gaseous or vapor flow meters, which is simple, rugged, accurate and efficient.

With these and other objects in view, which will become apparent as the description proceeds, my invention consists essentially of a closed chamber pressure-responsive element such as a Bourdon tube or the like having a portion movable in response to the pressure to be compensated for, a cam movable in response to the movements of said Bourdon tube, a fixed stop, a movable element whose movements are limited in one direction by said fixed stop and in the other direction by said cam, an electro-magnet connected so as to be electrically energized by a flow meter such as a steam meter, an armature arranged to be attracted by said electro-magnet when energized, a flexible stop limiting movement of said armature due to gravity when said electro-magnet is de-energized, said armature being arranged relative to said movable element so as to move said movable element during a portion of the gravity-actuated stroke of said armature, a first register arranged to indicate the movements of said movable element, and means for driving said first register from said movable element in one direction of movement thereof and leaving said register unmoved during movements of said movable element in the opposite direction.

The invention, both as to details of construction and combinations of parts, will be best understood from the following description of a specific embodiment which I illustrate as an example when read in connection with the accompanying drawing, in which.

Figure 1:
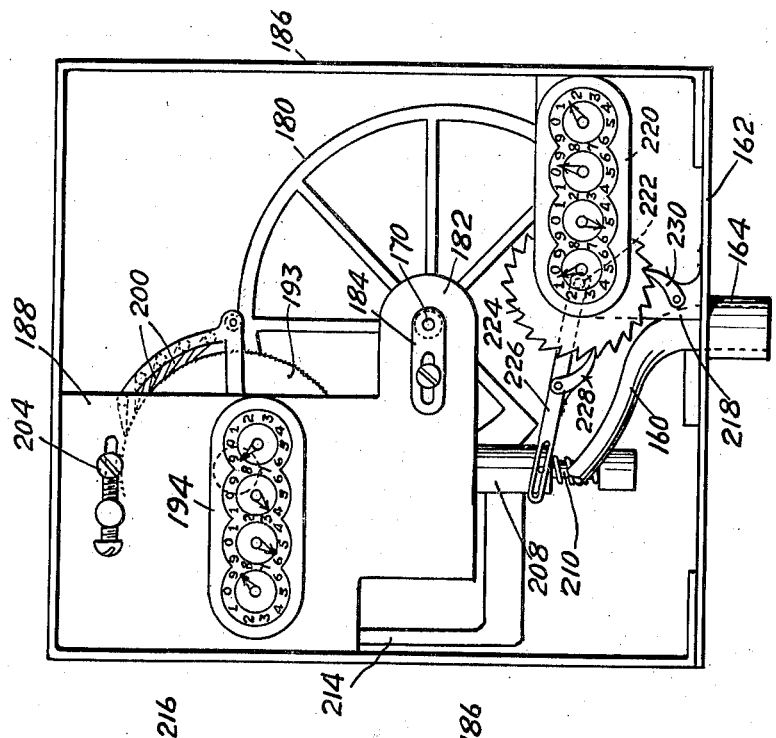
Fig. 1 is a front elevation of the device with the cover removed and parts broken away.
Figure 2:
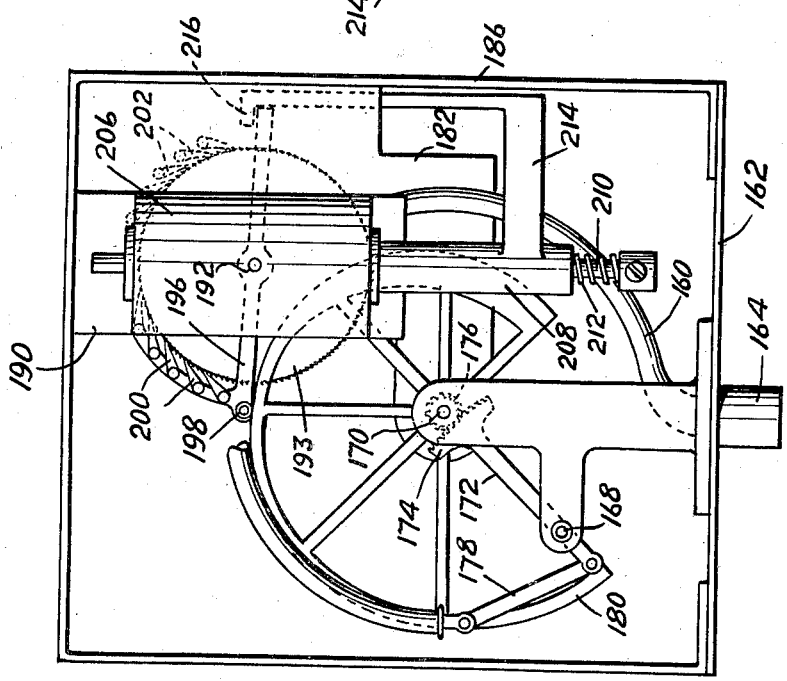
Fig. 2 is a rear elevation of the device with the back removed and parts broken away.

The pressure-responsive mechanism is an ordinary Bourdon tube pressure gage element 160 mounted on a base plate 162 and communicating with the steam or gas main by means of an internally threaded coupling 164. A support, rigidly attached to the base of element 160, is provided with bearings in which are journaled pin 168 and cam shaft 170. A lever 172 is pivoted on pin 168 and is provided at one end with a toothed sector 174 which meshes with pinion gear 176 integral with cam shaft 170. A link 178 connects the other end of lever 172 with the movable end of element 160. Cam 180 is fixed on shaft 170 which extends from the bearing in the support to a second journal 184 adjustably attached by a slot and screw to a supporting extension 182, to permit alignment of said shaft. A rectangular strap 186 (of inverted U-shape in side elevation as seen in Figs. 1 and 2) is secured to base plate 162 and supports extension 182 forming a part of a register supporting plate 188, and a solenoid mounting plate 190, these plates being mounted on strap 186 parallel to each other. A ratchet-wheel 193 is mounted between plates 190 and 188 on a shaft 192 journaled in said plates and projecting through plate 188 to connect with the gear train of a dial register 194 which is carried by plate 188. A lever 196 revolves freely about shaft 192 and is provided at one end with a projecting rod cam follower 198 and an extension which carries a series of pawls 200 pivoted thereto and engaging wheel 193 in such manner that it can be advanced fractional distances of one tooth when said lever is rotated. A similar set of pawls 202 pivoted to plate 188 prevents reversal of rotation of said wheel. An adjustable stop 204 (movable by means of the screw shown in Fig. 1) extends through a slot in plate 188 into alignment with pawl 200 and limits the movement of the lever extension, being adapted to meet the foremost of the advancing pawls 200 and exert on it a pressure radial to the wheel, thereby tending to prevent overshoot due to inertia of said wheel. An electrically-operated solenoid 206 is fastened to plate 190, its plunger 208 being guided by a central fixed rod 210, the weight of said plunger being supported by a shock-absorbing spring 212.

An arm 214 secured to the plunger 208 is provided with a finger 216 which engages the end of lever 196 opposite cam follower 198. A supporting plate 218 mounted on base plate 162 carries a second dial register 220 which is driven by a shaft 222 journaled in plate 218, said shaft carrying a fixedly attached toothed wheel 224 and a freely rotatable lever 226. Lever 226 is connected to plunger 208 by a pin and slot connection so that it oscillates with movement of said plunger, and carries a pivoted spring-pressed pawl 228 adapted to engage the teeth of wheel 224 and advance it a fixed distance for each operation of the solenoid. Another spring-pressed pawl 230, pivoted to plate 218, engages wheel 224 to prevent reverse rotation of the register.

This device operates as follows: On reception of an electric impulse, plunger 208 with finger 216 rises and releases lever 196, permitting the end weighted with pawls 200 to descend to the position shown, with cam follower 198 touching cam 180 whose position is determined by the pressure in the mains as transmitted by element 160. When the electric impulse ceases, the plunger descends under its own weight until finger 216 meets lever 196 (the position illustrated) and then advances said lever until the stop 204 is encountered, advancing register 194 an amount determined by the stop 204 and cam 180. At the same time lever 226 has been oscillated, and on its downward stroke has advanced register 220 by an increment which is constant because the plunger stroke is fixed, its upward limit being fixed by the customary stop within the solenoid and the lower limit being determined by the stop 204 through lever 196 and finger 216. This device is inherently free from shock effects occurring when the solenoid is energized, because all the registering action occurs on the solenoid return stroke. Furthermore, there is little pressure exerted on the cam because it receives only the gravity fall of lever 196.

I do not intend to be limited save as the scope of the attached claims may require.

I claim:

1. In a pressure compensator for a flow meter having a dial register and having a pressure-responsive element; a register-operating mechanism comprising, a cam rotated in response to movements of said element, a fixed stop, a movable element whose movement is limited in one direction by said cam and in the other direction by said fixed stop, an electro-magnet arranged to be energized intermittently by said flow meter, an armature arranged to be attracted by said electro-magnet when energized and to move by gravity when electro-magnet ceases to be energized, said armature being arranged to move said movable element during a portion of the gravity-actuated movement of said armature, and means for driving said dial register during the movement of said movable element in response to actuations of said armature.

2. In a pressure compensator for a flow meter having a dial register and having a pressure-responsive element; a register-operating mechanism comprising, a cam movable in response to the movements of said pressure-responsive element, a fixed stop, a movable element whose movements are limited in one direction by said cam and in the other direction by said fixed stop, an electro-magnet arranged to be intermittently energized by said flow meter, an armature arranged to be attracted by said electro-magnet when energized and to fall by gravity upon de-energization of said electro-magnet, a yielding stop limiting the movement of said armature away from said electro-magnet, said armature being arranged to actuate said movable element during a portion of the gravity-actuated movement of said armature, and means for driving said dial register from said movable element during the movements of said movable element under the actuation of said armature.

3. In a pressure compensator for a flow meter having a dial register and having a pressure-responsive element; a register-operating mechanism comprising, a cam mounted for rotation about an axis as a pivot in response to movements of said element, a fixed stop, an electro-magnet arranged so as to be periodically energized by movements of said meter, an armature controlled by said electro-magnet so as to be movable towards and away from said electro-magnet, a rotary member connected so as to rotate said dial register, and means interposed between said armature and said member whereby said member is rotated by movements of said armature away from said electro-magnet and is unmoved by movements of said armature in the opposite direction, said means being limited in one direction by said fixed stop and in the opposite direction by said cam.

4. In a pressure compensator for a fluid volume meter having a register and having a pressure-responsive device; a connection between the meter and the register communicating movement to the register in response to movements of the meter and comprising an electro-magnet connected so as to be periodically energized by said meter; an armature moved towards said electro-magnet when energized and moved by gravity away from said electro-magnet when de-energized; an arm engaged and driven by the armature during the gravity-actuated movement of the armature in one direction to a fixed point of travel at one end of its path; gravity-actuated means returning the arm; mechanism acting in response to said pressure-responsive device and varying the return movement of the arm as the pressure varies; and means responsive to the movement of the arm and operating the register.

5. In a pressure compensator for a flow meter having a dial register for registering the compensated flow of said meter and having a pressure-responsive element exposed to the pressure to be compensated for; a register-operating mechanism comprising, a cam movable under the control of said element, a fixed stop, a rocker arm mounted for oscillation between said cam and said stop and biased by gravity for movement in one direction, means movable in one direction in response to impulses transmitted from said meter and movable in the return direction by gravity and arranged to oscillate said rocker arm by gravity during said return movement, a rotary member mounted under the control of said rocker-arm and connected to said dial register, and second means co-operating with said member and said arm whereby for each oscillation of said arm said member is unidirectionally rotated through the angle of oscillation of said arm and said dial register is thereby driven a corresponding amount.

6. A register-operating mechanism for driving the dial register of a pressure-compensated flow meter so as to register the flow through said meter compensated according to the pressure at which it occurs, said mechanism comprising, a cam movable proportionately to the pressure to be compensated for, a fixed stop, a rocker arm mounted for oscillation between said cam and said stop and biased by gravity for movement in one direction, actuating means for moving said rocker arm against its gravity bias by means of gravity and movable in the opposite direction in response to impulses transmitted from said meter, a rotary member mounted under the control of said rocker arm and connected to said dial register, and unidirectionally operating means for driving said rotary member from said rocker arm during at least a part of the oscillation of said rocker arm against its gravity bias and while under the control of said actuating means, whereby for each oscillation of said rocker arm said rotary member is unidirectionally rotated through the angle of oscillation of said rocker arm and said dial register is thereby driven a corresponding amount.

WALTER C. WAGNER.